Jan. 6, 1931.     A. B. DRÄGER     1,788,282
DISENGAGEABLE COUPLING FOR PIPES OR HOSES
Filed Nov. 19, 1926
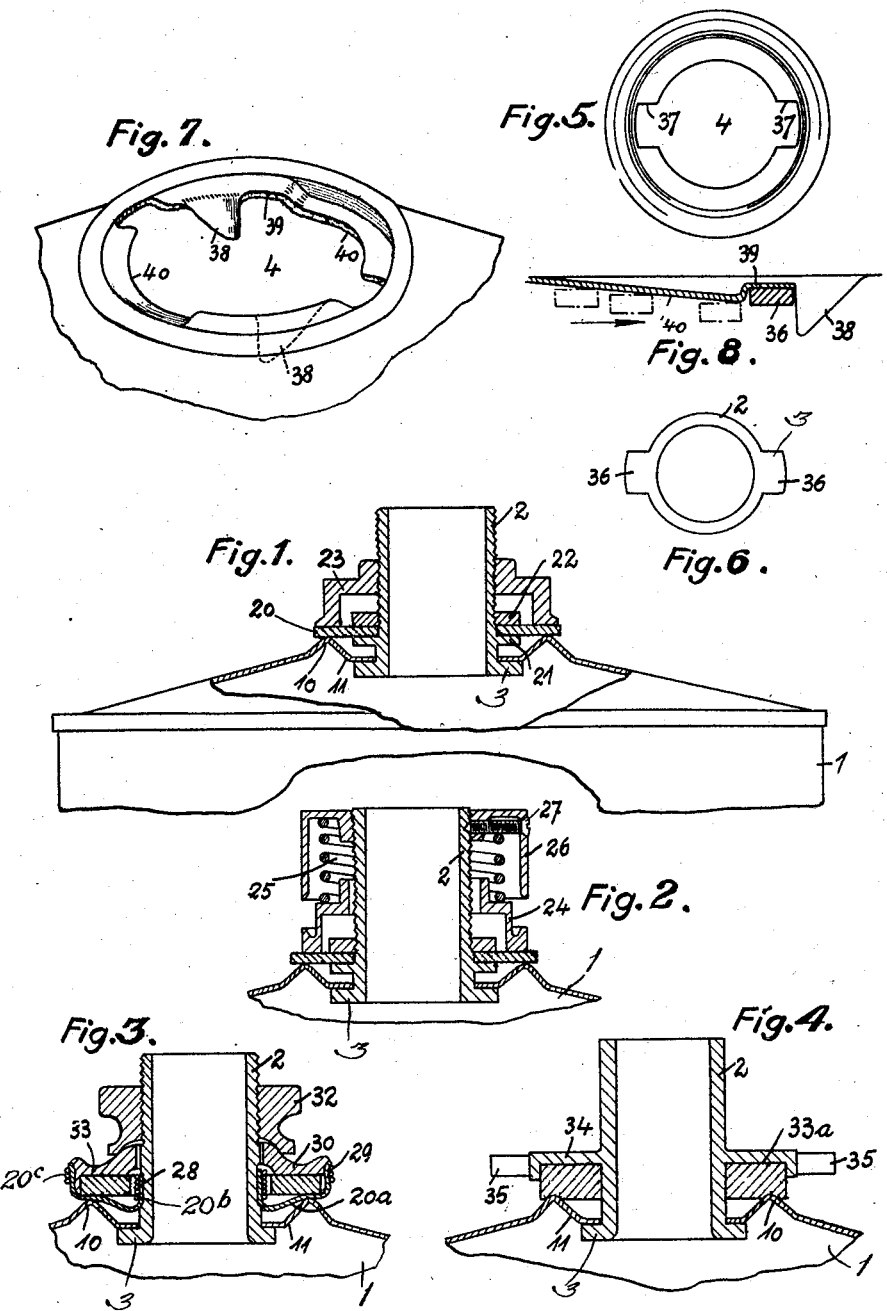
INVENTOR
ALEXANDER BERNHARD DRÄGER
BY
ATTORNEYS Patented Jan. 6, 1931

1,788,282

UNITED STATES PATENT OFFICE

ALEXANDER BERNHARD DRÄGER, OF LUBECK, GERMANY; ELFRIEDE DRÄGER, NÉE STANGE, EXECUTRIX OF SAID DRÄGER, DECEASED, ASSIGNOR TO HEINRICH OTTO DRAGER, OF LUBECK, GERMANY

DISENGAGEABLE COUPLING FOR PIPES OR HOSES

Application filed November 19, 1926, Serial No. 149,302, and in Germany partly on March 9, 1926, and partly on March 23, 1926.

To connect filter cartridges or canisters of breathing apparatus for instance with a breathing hose or a breathing mask heretofore couplings were used either having a plate screw-thread or a metal screw-thread or a yoke joint or bayonet joint and similar devices. All these systems of couplings require an inconvenient and costly construction of the canister bottoms or walls.

One object of the present invention is to provide a coupling which requires only a fluid tight coupling device for attaching a pipe to the wall of a receptacle having a simple opening therein and nevertheless guarantees the requisite firm connection. The invention although applicable to all kinds of connections of pipes or hoses to the walls of receptacles is particularly designed for breathing apparatus, no matter what object such receptacle has. In the term "receptacle" it is intended to include all kinds of vessels whether open or closed, or box-like members or the like, because the applicability of the invention is always present when it is a question of connecting a pipe or hose with a surface at an opening of any kind.

Another object of the invention is to provide a pipe, which may be inserted into the opening of the receptacle wall from the outside, and is provided with a head having lateral projections catching behind the edge of the opening of the wall and which pipe moreover carries a nut or the like which, preferably by the introduction of a packing plate, presses against a ridge provided on the outer face of the receptacle wall and surrounding the communication hole therein. When the nut is drawn home the outer face of the packing plate will be pressed against the ridge of the wall thereby providing a fluid-tight joint.

The reliability of the joint may be improved upon by constructing the packing plate as a diaphragm-like annular plate connected in a fluid tight manner to a shoulder provided on the pipe.

It is evident that the inventive idea may be carried out by divers modes of construction.

Fig. 1 is an axial section through a coupling device constructed according to my invention and permitting the insertion of the pipe without tilting the same.

Figs. 2, 3 and 4 are sections of three different modifications.

Fig. 5 is a plan view of the wall of the receptacle showing a communication opening therein.

Fig. 6 is the end view of a pipe with its head designed to be inserted in the opening shown in Fig. 5.

Fig. 7 is a perspective view of the wall with a modified form of communication opening, and Fig. 8 is a diagrammatic illustration of one half of the inside of the receptacle opening of the modification shown in Fig. 7.

In the construction shown in Figs. 1 to 4 a receptacle 1, for instance a canister or a cartridge, is to be connected to a pipe 2, which may be either a hose or a pipe connected to a hose. This pipe 2 is provided at its ends with a flange or a head 3 of such size and shape that it is possible to introduce it into a communication hole or opening 4 of the receptacle.

It is advisable to arrange the opening 4 on a conical part of the wall, which may be produced by stamping a recess or an indentation 11 into the wall reinforced by a ridge 10 surrounding the hole 4 thus increasing the resistibility of the opening against the pressure of the coupling.

Preferably the coupling flange or head 3 as well as the opening of the receptacle has a similar but non-circular shape, so that the coupling head may be introduced in upright position, that is to say at right angles to the wall of the receptacle. After introducing the coupling head in upright position of the pipe, it catches behind the wall after having been rotated through a certain angle.

In the construction shown in Fig. 1 a diaphragm-like annular packing plate 20 of rubber, leather or the like is mounted on the pipe 2 in gas-tight connection with a shoulder 21. Preferably, the packing plate is pressed against the shoulder 21 by an annular nut 22 screwed on to the thread of the pipe or neck 2. Thus that part of the packing plate 20 which projects laterally beyond the shoulder 21 as well as beyond the ridge 10, has a free flexibility to be moved up and down. The mean diameter corresponds to the annular ridge 10 surrounding the opening 4 of the receptacle 1 (canister, cartridge or the like) the inside of which ring forms at the same time a conical indentation 11 of the wall of the receptacle 1. To create the necessary pressure between the packing plate 20 and the crest of the ridge 10 a screw cap 23 is provided, which by its annular ring bears against the upper side of the packing plate 20.

The construction shown in Fig. 2 differs from that of Fig. 1 in that the screw cap 23 used in Fig. 1 is replaced by a shiftable tubular bearing piece 24, which is forced against the packing plate 20 by the spring 25, which at its upper end bears against the inner face of a nut 26 screwed to the pipe or neck 2, and after being screwed tight the cap is locked by a set screw 27.

In the construction shown in Fig. 3 the packing plate 20ª has the shape of a double turned-up collar the inner flange 20ᵇ being fastened to a recessed part of the neck or pipe 2 by cords, wires or threads 28 in a gas tight connection, and the outer flange 20ᶜ is connected by similar means 29 to the outer periphery of a disk 30 which surrounds shiftably the neck 2. A nut 32 screwed down on the thread of the pipe 2 serves for pressing the packing plate 20ª on the crest of the ridge 10. Intermediate of the fastening members 28 and 29 the pliable packing plate 20ª is freely movable. A thick ring 33 of yielding or elastic material for instance rubber is inserted between this packing plate and the disk 30.

Common to the construction shown in Fig. 2 and the construction shown in Fig. 3 is the fact that immediately after inserting the coupling into the opening of the receptacle the requisite pressing takes place, because when the coupling is applied the spring 25 as well as the rubber cushion 33 will be strained. The same is to be said with regard to the construction shown in Fig. 4. The latter differs from the constructions shown in Fig. 3 essentially in, that the rubber cushion 33ª, which is made particularly thick, acts as the packing plate which is pressed directly on the ridge 10 without the intermediary of a flexible packing plate 20ª. This rubber cushion 33ª has also the shape of a ring and is placed into an annular groove of a shoulder or flange 34 provided on the neck 2. Preferably the flange 34 is provided with finger-pieces 35 on its outer edge.

In Figs. 5 and 6 I have shown a preferred form of the opening 4 and the coupling head 3. The coupling head shown in Fig. 6 consists of lugs 36 integral with the tubular neck or pipe 2. The outer periphery of the coupling head 3 and the inner periphery of the opening 4 of the receptacle shown in Fig. 5 are essentially equal, so that the coupling foot or head may pass through the opening of the receptacle which is provided with recesses 37 corresponding in shape to the lugs or projections 36. Ears 38 projecting inwardly are arranged on the edge of the opening and serve as stops for the lugs or projections 36 which catch behind the wall of the receptacle when the coupling head is rotated through a certain angle after insertion into the opening 4. In front of the ears 38 recesses are provided to be entered by the projection 36, when the head 3 reaches its final position. Leading up to this notch are sloping faces 40 provided on the back of the wall which however can be replaced by turning-up the edges of the receptacle inside. The inclination of these sloping faces or edges is so chosen that in the construction shown in Fig. 1 the packing plate 20 from the beginning on is subjected to an initial compression, which may be increased ad libitum by pulling up the screw cap 23, or in the constructions shown in Figs. 2 to 4 which are yielding in themselves, the final compression of the packing member is effected when the lugs 36 engage into the notches 39, so that in the latter case it is only necessary to insert the coupling foot into the opening and to give it a turn, so as to secure a reliable connection which is perfectly tight.

In the construction shown in Fig. 6 the operation of the coupling is much simplified without impairing the reliability of the joint. Nevertheless simplicity and cheapness in the manufacture of the canisters or the cartridges is well taken care of; because though the edge of the opening of the receptacle is not smooth, nevertheless the shape is such which can be produced in the most simple manner by stamping or pressing. This is of considerable importance since the canisters or cartridges as a rule are thrown away after use and therefore must have a very slight value with regard to the material.

I claim:—

A fluid tight coupling device for attaching a pipe to the wall of a receptacle to form a communication therewith, comprising an outer ridge surrounding a communication hole provided in said wall, a head on the pipe to bear against the back of the wall, a fixed abutment provided on the pipe, an elastic packing mounted on said abutment and means for holding it in gas tight connection therewith, said elastic packing projecting laterally beyond said fixed abutment as well as beyond said ridge, and means on said pipe exerting a pressure on the projecting rim of said packing plate to press the same against the crest of said ridge, the profiles of the hole and the head being of non-circular shape, said non-circular head being of smaller size than said non-circular hole and having one portion of greater width than the width of one portion of said hole, whereby the head may be passed through the hole from the outside of the receptacle and then be turned into final position, in which the head bears against the back of the wall.

In testimony whereof I have signed my name to this specification.

ALEXANDER BERNHARD DRÄGER.